Oct. 9, 1956  K. GOLDSMITH ET AL  2,766,265
METHOD AND APPARATUS FOR MEASURING PROGRESS OF HYDROGENATION
Filed June 11, 1952  6 Sheets-Sheet 1
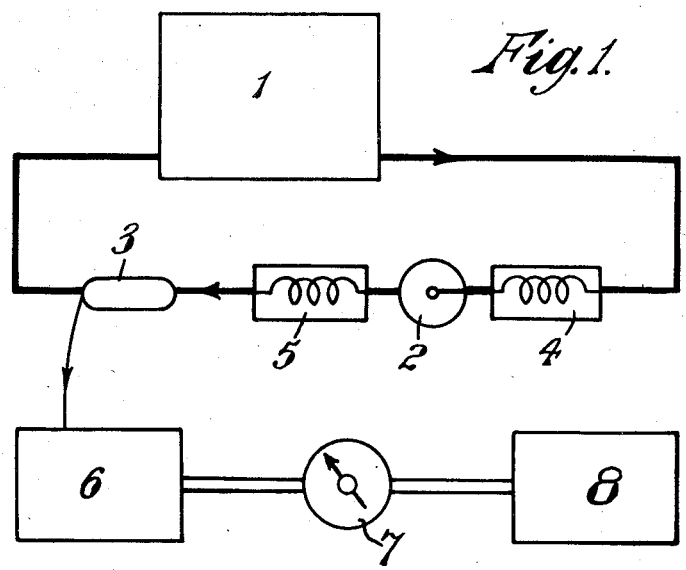
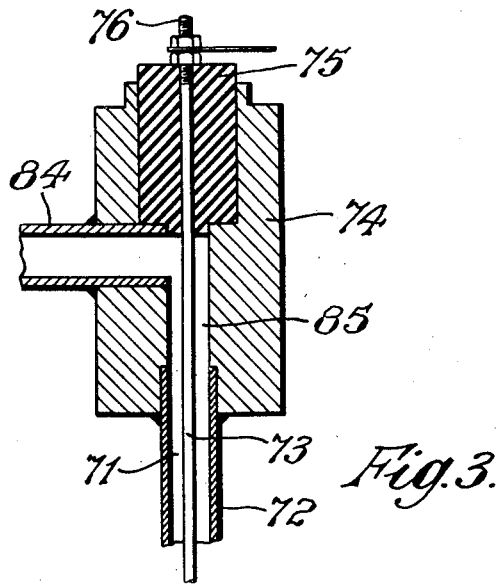
INVENTORS.
KURT GOLDSMITH
VIVIAN DESMOND WORSTALL
PETER WILLIAM HESELGRAVE
BY
Campbell, Brumbaugh, Free & Graves
THEIR ATTORNEYS

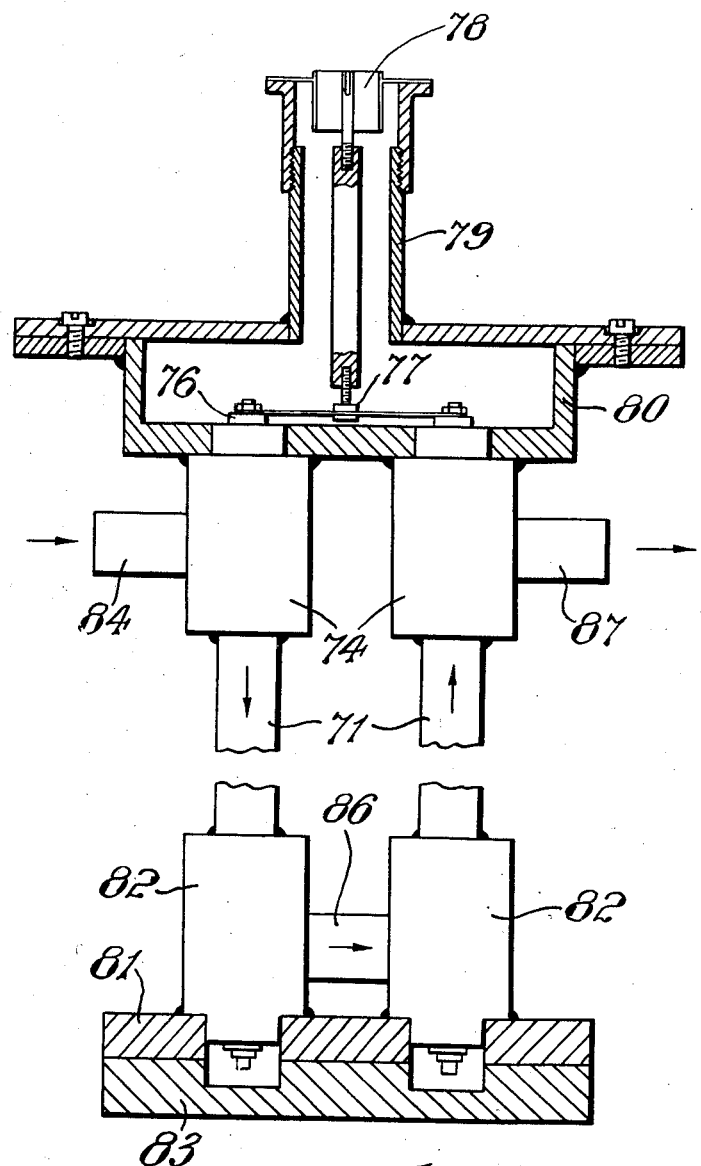

INVENTORS.
KURT GOLDSMITH
VIVIAN DESMOND WORSTALL
PETER WILLIAM HESELGRAVE
BY
Campbell, Brumbaugh, Free & Graves
THEIR ATTORNEYS

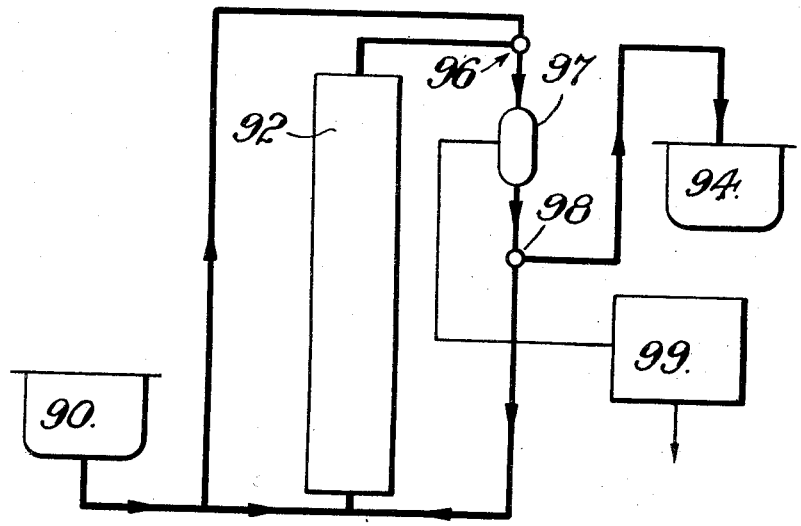
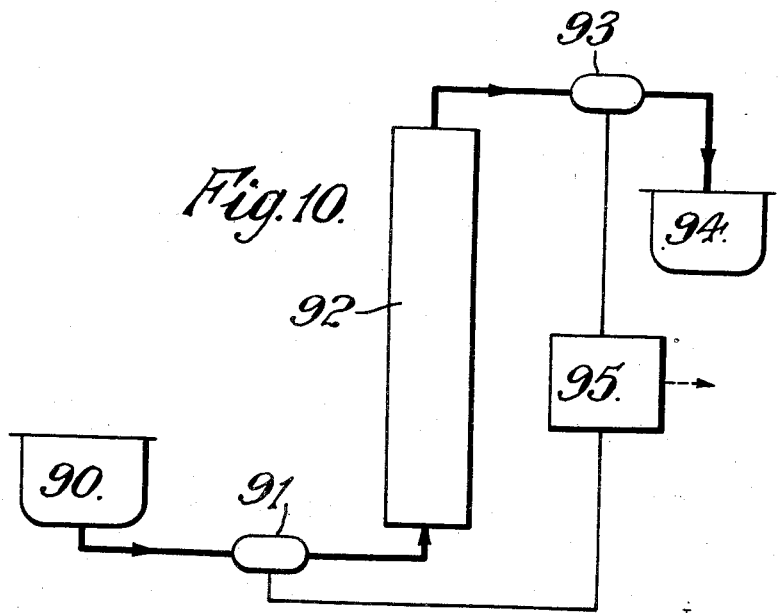

United States Patent Office 2,766,265
Patented Oct. 9, 1956

2,766,265

METHOD AND APPARATUS FOR MEASURING PROGRESS OF HYDROGENATION

Kurt Goldsmith, Claughton, Vivian Desmond Worstall, Bebington, Wirral, and Peter William Heselgrave, Hove, England, assignors to Lever Brothers Company, New York, N. Y., a corporation of Maine Application June 11, 1952, Serial No. 292,944

Claims priority, application Great Britain June 14, 1951

28 Claims. (Cl. 260—409)

This invention relates to the measurement of changes in the degree of unsaturation of animal and vegetable oils and fatty acids derived therefrom and in particular to measuring, recording, and controlling changes in the degree of unsaturation of oils during the hydrogenation process.

The degree of unsaturation of oils is normally expressed in terms of their iodine values. As the relationship between the iodine value of an oil and its refractive index is well known, and as the refractive index lends itself to easier measurement, in practice iodine values of oils are usually measured in terms of their refractive indices.

When it is desired to lower the degree of unsaturation of an oil by the process known as hydrogenation, samples of the oil are withdrawn at frequent intervals from the apparatus in which hydrogenation is taking place, the samples are then filtered to remove the catalyst, and the refractive index of the filtered sample is then measured to determine the iodine value of the oil. When the sample shows the required refractive index, that is when it has reached the required iodine value the hydrogenation process is stopped. As a certain time lag occurs between the removal of the sample and the completion of the measurement, it is necessary to make an estimate of the rate at which hydrogenation is proceeding and to make an allowance for this factor.

It is an object of the present invention to provide novel and improved method and apparatus for measuring changes in the degree of unsaturation of oils.

It is a further object of the present invention to provide method and apparatus whereby the change in the degree of unsaturation of an oil during the hydrogenation process is measured and which gives a suitable warning, or stops the hydrogenation process automatically, when a predetermined change has occurred.

Further objects of the present invention are to provide method and apparatus for automatically controlling and recording the progress of the hydrogenation process.

For the purpose of this specification, the term "oil" is used to describe animal and vegetable oils and fatty acids derived therefrom, for example, whale oil or ground nut oil. The term animal oil is meant to include fish oils, for example, herring oil.

It has been found that permittivity is a particularly useful parameter for measuring changes in the degree of unsaturation of oils.

It has also been found that there exists a relationship between the permittivity and the degree of unsaturation of an oil which is substantially linear over the commercially important range of unsaturation at a frequency below that which produces relaxation of the dipoles of the molecules of the oil.

It has further been found that the change in permittivity for a given change in degree of unsaturation is nearly constant for a large number of oils.

It has further been found that the relationship between permittivity and the degree of unsaturation of an oil is substantially unaffected by the presence of a catalyst if the catalyst concentration remains constant.

According to the present invention there is provided a method of measuring changes in the degree of unsaturation of an animal or vegetable oil or a fatty acid derived therefrom, which method comprises measuring the change of permittivity of the oil or acid at a frequency below that which produces relaxation of the dipoles of its molecules and if necessary making an allowance for temperature variations.

According to the present invention there is also provided a method for controlling the hydrogenation process which comprises measuring the difference between the permittivity of the oil or fatty acid derived therefrom at the beginning and during the hydrogenation process, and stopping the hydrogenation process when the difference in permittivity reaches a predetermined value.

According to the present invention there is also provided an apparatus for measuring changes in the degree of unsaturation of an animal or vegetable oil or a fatty acid derived therefrom for the purpose of measuring the progress of hydrogenation, which apparatus comprises a hydrogenation vessel, a capacitance cell capable of utilising the oil or acid as the dielectric, the cell being connected to the hydrogenation vessel to enable oil or acid from the vessel to pass through it, and capacitance measuring means for measuring the capacitance of the capacitance cell.

According to the present invention there is further provided an apparatus for the control of the hydrogenation process.

The permittivity and, hence, the iodine value may also be recorded. Furthermore, the method according to the present invention may be used to control such factors as the temperature of the oil, the agitation of the oil, and the pressure and supply of the hydrogen so as to maintain the rate of hydrogenation at a predetermined value. The method according to the present invention may also be used to give a warning when any desired change in the degree of unsaturation has been reached.

It will be evident that the method and apparatus according to the present invention are applicable to a continuous hydrogenation as well as to a batch hydrogenation process.

The major factors influencing the relationship between degree of unsaturation and permittivity are the temperature of the oil, and the presence of catalyst, moisture and free fatty acids in the oil. It has been found that a change of temperature of 0.3° C. is roughly equivalent to unit change of iodine value. Consequently, the temperature of the oil whose permittivity is being measured must either be kept substantially constant or an allowance must be made for temperature variations. As long as no appreciable change in the quantity of catalyst, moisture, or free fatty acids present in the oil occurs during the hydrogenation process, the presence of these substances introduces a constant factor which can be balanced out by the initial measurement of permittivity because all measurements of permittivity and of changes of permittivity can be made with the same amount of these substances present in the oil. If a known amount of catalyst is introduced into the oil, that is if the catalyst concentration is changed, during the hydrogenation process, the change produced in the measured value of permittivity can be calculated and an allowance made for it.

For the purpose of measuring permittivity or change of permittivity of the oil, the oil can be passed continuously through a cell which constitutes the electrodes of a capacitor of which the oil forms the dielectric. There is, therefore, no need to withdraw samples of the oil for measurement purposes. In practice, the electrical parameter which is being measured is the capacitance of the cell. The permittivity of the oil which forms the dielectric can be obtained from the capacitance if the dimensions of the electrode system are known or, preferably, by measuring the capacitance of the cell when filled with a liquid of known permittivity, for example benzene, and calculating the cell constant from this measurement.

The preferred frequency range for measuring the permittivity of the oil is the radio frequency range, and within that range, the range 1–5 mc./s. has been found particularly useful.

Any of the known methods for measuring capacitance in this frequency range may be used, but the heterodyne method is preferred.

Preferred forms of the invention will now be described with reference to the accompanying drawings in which:

Fig. 1 shows a schematic diagram of the apparatus,

Fig. 2 shows a cross section of the capacitance cell,

Fig. 3 shows a detail of one element of the capacitance cell,

Figure 4:
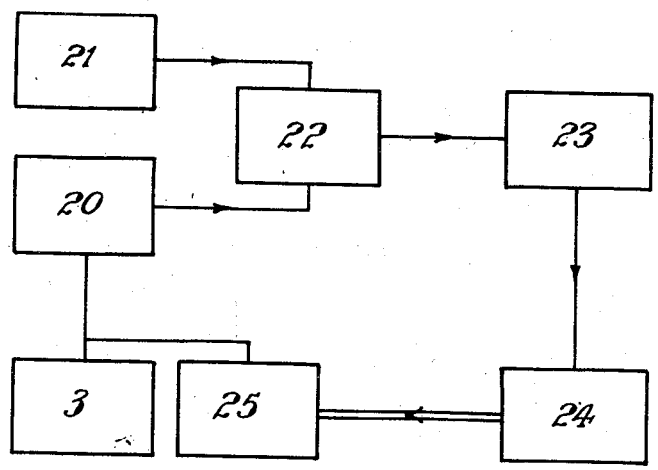
Figure 5:
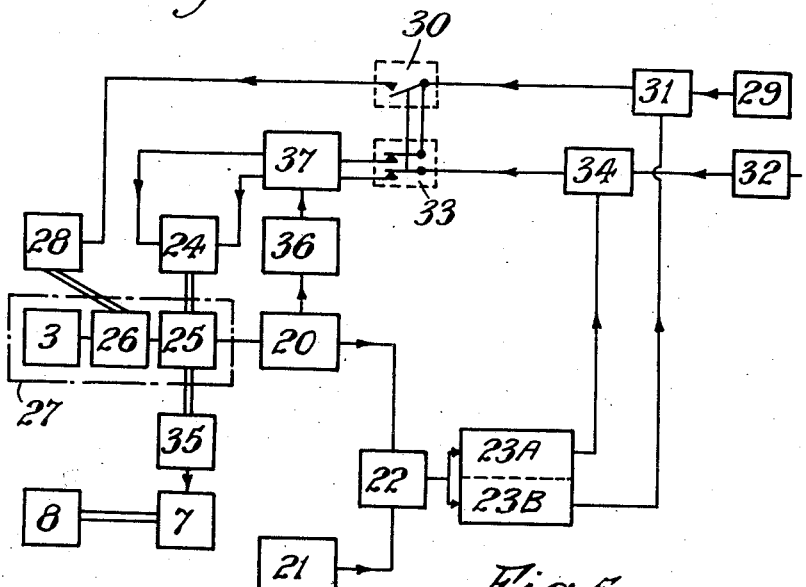
Figure 6:
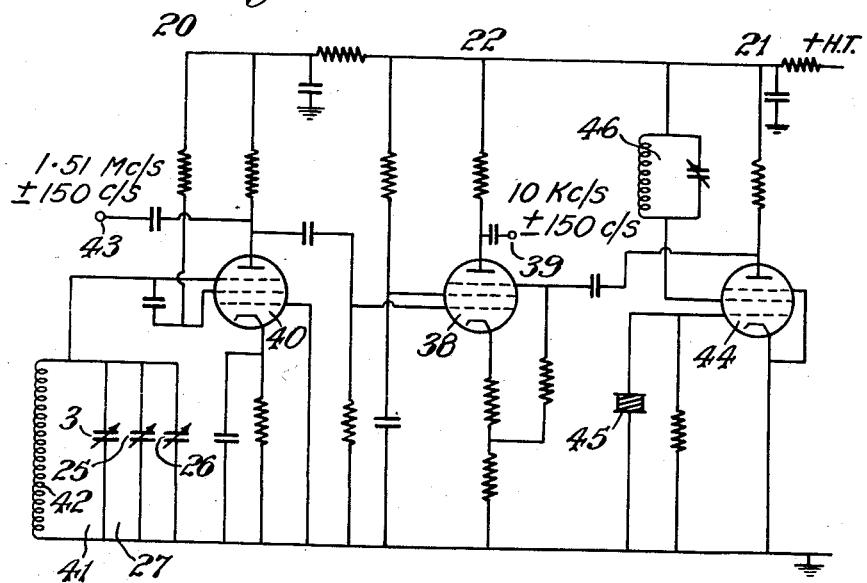
Figure 7:
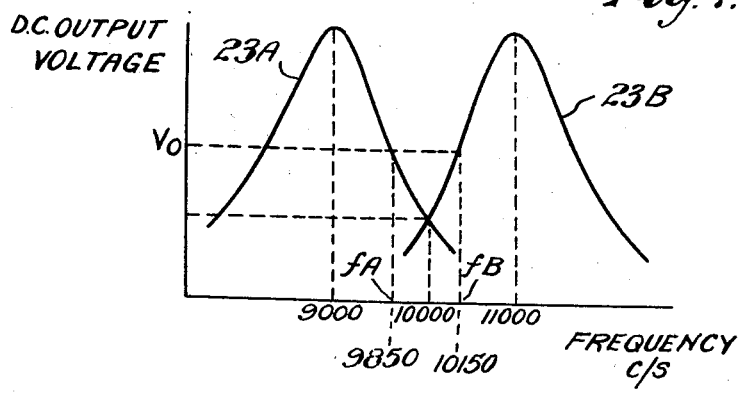
Figure 8:
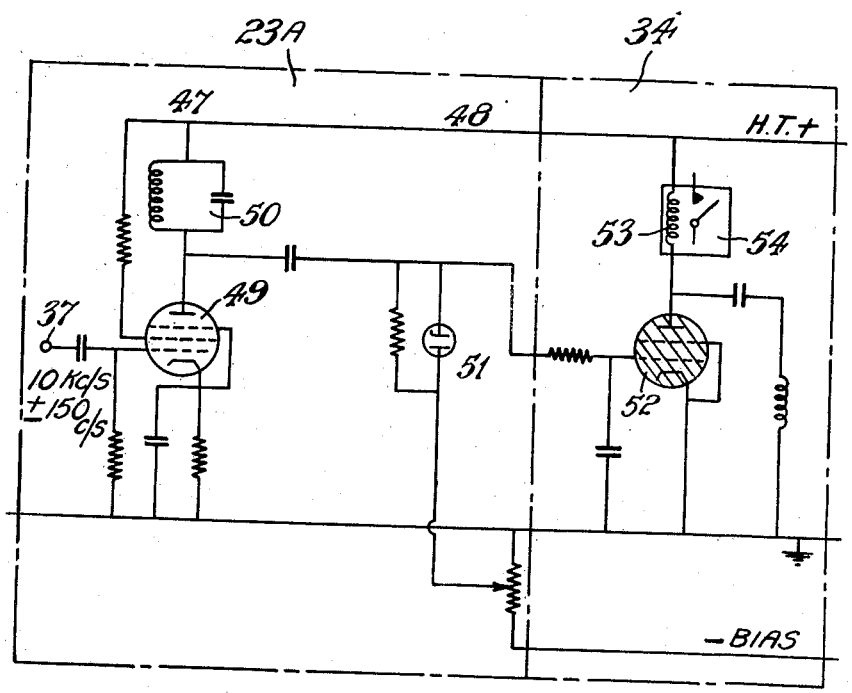

Fig. 4 shows a simplified block diagram of the self-balancing heterodyne system, Fig. 5 shows a block diagram of the automatic hydrogenation control unit, Fig. 6 shows the heterodyne circuit, Fig. 7 shows the frequency characteristics of the discriminator, Fig. 8 shows the circuit of a frequency discriminator and a relay unit, Fig. 9 shows a schematic diagram of the apparatus of Fig. 1 adapted for a continuous hydrogenation process, Fig. 10 shows a schematic diagram of the apparatus of Fig. 1 adapted for a continuous hydrogenation process and using two capacitance cells.

Referring to Fig. 1, a small amount of oil from the hydrogenation vessel 1 is continuously circulated by means of a circulating pump 2 through a capacitance cell 3. Heat exchange means comprising a pre-cooler 4 and a secondary heat exchanger 5 are inserted in the oil pipe line between the hydrogenation vessel 1 and the capacitance cell 3 to keep the temperature of the oil in the cell substantially constant. The permittivity of the oil in the capacitance cell is measured automatically by a self-balancing heterodyne unit 6 and the output of this unit is applied to an indicator which also acts as a recorder 7 and indirectly also to an end-point controller 8 which can initiate any desired operation when the required change in the degree of unsaturation has been reached.

The apparatus, thus, consists essentially of two parts: equipment for handling the oil, and equipment for measuring, recording and controlling its permittivity and, hence, its degree of unsaturation.

During hydrogenation, the oil temperature in the hydrogenation vessel normally increases from 100° C. to 180° C. but temperatures of up to 200° C. occur occasionally. If it is desired to measure the iodine value of the oil to an accuracy of ±0.5 I. V., the temperature of the oil must, as has been stated earlier, be kept constant to ±0.15° C. The heat exchanger system must, therefore, be designed to reduce temperature changes of up to 100° C. of the incoming oil to a temperature change of the outgoing oil not in excess of ±0.15° C. To ensure temperature constancy of this order, two heat exchangers connected in series are used. The oil is first passed through a primary heat exchanger or pre-cooler 4 in which the oil temperature is brought to within ±5° C. and is thus roughly controlled, and then through a secondary heat exchanger 5 in which the temperature variation is reduced to ±0.15° C. The most satisfactory temperature for the outgoing oil from the secondary heat exchanger 5 was found to be 70° C., which means that the maximum temperature of the oil from the pre-cooler 4 must be slightly less than 70° C. since it is desirable to operate the secondary heat exchanger 5 on a positive heat cycle.

The circulating pump 2 must be capable of handling oil containing catalyst at a high temperature and of working against the flow resistance in the comparatively long pipe runs. The circulating pump 2 is situated between the two heat exchangers so that it may operate at a nearly constant temperature, this constant temperature also being considerably lower than that of the oil in the hydrogenation vessel.

Since oil circulates continuously through the capacitance cell, the cell should exert as small a resistance to the oil flow as possible and it should be filled with a sufficiently large volume of oil to reduce spurious changes in the cell capacitance due to random agglomerations of catalyst or occasionally large hydrogen bubbles. Errors due to the latter can be reduced if the pressure of the oil passing through the capacitance cell is kept substantially constant. The pressure control means may be in the form of a pressure relief valve connected to the pipe which supplies the cell.

The construction of the capacitance cell is shown in Figures 2 and 3. The cell comprises five elements through which the oil passes in sequence. The elements 71 (see Fig. 3) comprise a tube 72 which serves as the earthed electrode and a centre rod 73 which serves as the live electrode. The tube 72 is welded into a housing 74. The centre rod 73 passes through an insulator block 75 which is secured in the housing in a fluid tight manner. The rod 73 is screw threaded at its ends and, together with nuts and washers, provides a terminal 76. The terminals 76 of all the centre rods 73 are electrically connected by an electrical connector 77 which is connected to a centre electrode of a co-axial connector 78 supported on a flange 79. The flange 79 is secured by screws to a pot 80 to which the housings 74 are welded. The rods 73 at the ends opposite to the terminals 76 are supported by insulators similar to those described above, and are secured by means of nuts. The housings 82 at these ends of the elements are welded to a plate 81 which is provided with clearance spaces for the ends of the rods. The plate 81 is secured by screws to a plate 83 which is provided with similar clearance spaces. The effective length of the elements is approximately 10" and the full length of the cell is approximately 14". The diameter of the centre rods 73 is approximately ⅛" and the internal diameter of the tube 72 is approximately $^{11}/_{32}$". The cell is mounted vertically in the secondary heat exchanger 5. The oil enters the cell at the top through an oil inlet pipe 84 which is welded to one of the housings 74 connected by a bore 85 in the housing with the tube 72. The elements are connected for the purpose of the oil flow by means of oil connecting pipes 86, and the oil passes out of the cell through an oil outlet pipe 87, these pipes being connected with the tubes 72 in a similar manner to the oil inlet pipe. For the purpose of simplicity, only two elements have been shown in Fig. 3. It will be evident that when five elements are used, the inlet and outlet pipes will be at opposite ends of the cell.

Fig. 4 shows the disposition of the principal circuit elements of the self-balancing system comprising a variable frequency oscillator 20, a fixed frequency oscillator 21, a frequency mixer 22, a frequency discriminator 23, a rebalancing servomotor 24, a variable air capacitor 25, and a capacitance cell 3. The capacitance cell 3 and the variable air capacitor 25 are connected in parallel and are, consequently, directly additive so that variations in the angular setting of the capacitor 25 may be made proportional to the changes of degree of unsaturation of the oil. For this reason the variable air capacitor 25 is referred to as the I. V. capacitor. For reasons later appreciated the variable air capacitor 25 may also be referred to as the rebalancing capacitor. The circuit is arranged to maintain the output frequency of the mixer 22 at a fixed frequency of 10,000 c./s. which corresponds to a frequency of the variable oscillator 20 of 1.5 mc./s.+ 10,000 c./s. If the permittivity of the oil changes, the capacitance of the capacitance cell 3 will vary and the output frequency of the mixer 22 will deviate from 10,000 c./s. This causes the frequency discriminator 23 to operate the servomotor 24 which rotates the I. V. capacitor 25 until the tuning capacitance in the variable oscillator circuit again reaches that value at which the output frequency of the mixer 22 is 10,000 c./s.

The system, thus, adjusts the I. V. capacitor 25 and thereby the tuning capacitance of the tank circuit of the variable frequency oscillator circuit 20 in order that the frequency difference between the two oscillators remains constant. The frequency discriminator 23 also determines whether the frequency difference is above or below the desired input of 10,000 c./s. so that the servomotor 24 will rotate the I. V. capacitor 25 in the correct direction to compensate for changes in permittivity of the oil.

A more detailed block diagram of the automatic hydrogenation control unit is shown in Fig. 5. Variations in the initial permittivity of the oil are compensated by connecting a zero balance capacitor 26 in parallel with the I. V. capacitor 25 and the capacitance cell 3. As the difference in permittivity of the different oils is far greater than the change in permittivity which takes place during the hydrogenation of any one oil, the zero balance capacitor 26 has a considerably larger capacitance than the I. V. capacitor 25. Together these three capacitors form the tuning capacitance 27 of the tank circuit of the variable oscillator 20.

The frequency discriminator 23 consists of two similar halves which will be referred to as the forward frequency discriminator 23A and the reverse frequency discriminator 23B.

The zero balance capacitor 26 is driven by means of a zero balance servomotor 28 which is electrically connected to a suitable source of supply 29 by means of a single pole zero balance switch 30 in series with a reverse relay unit 31. The reverse relay unit 31 is controlled by the output of the reverse frequency discriminator 23B. Similarly, the I. V. capacitor servomotor 24 is electrically connected to two suitable sources of supply 29, 32 by means of a double pole I. V. switch 33 having one of the poles away from the motor connected to the reverse relay unit 31 and the other pole away from the motor connected to a forward relay unit 34. The forward relay unit 34 is controlled by the output of the forward frequency discriminator 23A. Thus, though the zero balance capacitor can only be rotated in one direction, the I. V. capacitor can be rotated in two directions. The zero balance switch 30 and the I. V. switch 33 are mechanically coupled so that when one is closed the other is open.

Sequencing means, not shown, are used in order to attain the correct sequence of operations for zero balancing. The sequencing means comprise a relay having one contact mounted on the I. V. capacitor shaft and rotating with it and the other contact mounted in a fixed position. The sequencing means comprise further a relay for disconnecting the frequency discriminator from the forward and reverse relay units 34, 31 and for causing the injection of a signal into the revers relay unit 31 to close it, and a zero balance indicator connected to the motor side of the zero balance switch 30 and capable of opening the zero balance switch 30 and closing the I. V. switch 33 when the zero balance motor 28 ceases being energised. The interconnection between the various components of the sequencing means will be apparent from their functions.

In operation, the I. V. switch 33 is closed and the I. V. capacitor 25 is rotated by the I. V. servomotor 24 until it reaches a position corresponding to the zero change in I. V. This position is determined by the relay having one contact mounted on the I. V. capacitor shaft. The contact on the shaft is arranged so that when it touches the fixed contact, the I. V. capacitor 25 is in the position corresponding to zero change in I. V. When the contacts close, the relay operates and opens the I. V. switch 33 and closes the zero balance switch 30. The output of the frequency discriminator 23 then causes the zero balance servomotor 28 to rotate the zero balance capacitor 26 until the frequency of the mixer output is 10,000 c./s. The circuit is then in balance, thus opening the reverse relay unit 31 causing the zero balance motor 28 to be de-energized. This results in the zero balance indicator opening the zero balance switch 30, thereby locking the zero balance capacitor 26 in position, and closing the I. V. switch 33 in order to commence normal operation of the I. V. capacitor 25. A desyn transmitter 35 is mechanically coupled to the shaft of the I. V. capacitor and transmits its angular position to the I. V. indicator 7 which is a desyn receiver. Any required end-point may be pre-set on the I. V. indicator 7 by means of an auxiliary pointer capable of making an electrical connection with the indicator pointer mounted on the shaft of the desyn receiver, so that a visual or aural warning is obtained when the indicator pointer reaches the predetermined position. The auxiliary pointer and the associated relays constitute the end-point controller 8. Apart from merely giving a warning, the end point controller can also stop the process by controlling a motorised valve, for example to stop the supply of hydrogen to the hydrogenation vessel or to cool the hydrogenation vessel by circulating water in its jacket rather than steam, or a combination of these.

Should it be desired to control the rate of hydrogenation as well as the end point, the following type of controller may be used. A cam having a profile which is a function of the required law is rotated at a constant speed. A cam follower actuates the wiper arm of a potentiometer which is in parallel with a second potentiometer the wiper arm of which is actuated by the indicator 7. The two potentiometers are energised by a suitable A. C. or D. C. source. The difference between the cam follower position and the indicator position, that is the deviation of the rate of hydrogenation from a predetermined rate, is a function of the electric potential between the two wiper arms. This electric potential is fed to a phase sensitive relay which controls, for example, a motorised valve to adjust the hydrogen supply or the temperature of the hydrogenation vessel. If the indicator comprises a recorder having a chart rotated at a constant speed, the cam may be secured to the spindle driving the chart. This type of controller may, in addition, act as an end point controller as described above.

Since there are two frequencies of the variable oscillator 20, namely $1.5 \pm 0.01$ mc./s., which differ from the frequency of the fixed oscillator 21 by 10,000 c./s., it is necessary to insert a frequency discriminator 36 and an associated relay 37, which is situated between the I. V. servomotor 24 and the I. V. switch 33, to ensure that the I. V. servomotor 24 can operate only when the variable oscillator frequency is in the proximity of one of these frequencies, namely $1.5 + 0.01$ mc./s.

The heterodyne circuit diagram is shown in Fig. 6. The heterodyne circuit consists essentially of a transitron variable oscillator generally designated by 20, a crystal controlled fixed oscillator generally designated by 21, and a pentode mixer generally designated by 22.

The outputs from the two oscillators are applied to the control grid and the suppressor grid of the mixer pentode 38. The output of the mixer 22, which is fed to the frequency discriminators 23A and 23B, is taken to a terminal 39.

The variable oscillator 20 comprises a pentode 40 having a tank circuit 41 between earth and the suppressor grid. The tank circuit 41 consists of an inductance 42 connected in parallel with the tuning capacitance 27 which comprises the capacitance cell 3, the I. V. capacitor 25, and the zero balance capacitor 26. The output of the variable oscillator 20 which is fed to the frequency discriminator 36 is taken to a terminal 43.

The fixed oscillator 21 consists of a pentode 44, having connected in its grid circuit a piezo-electric crystal 45, the natural frequency of which is 1.5 mc./s., and in its screen circuit a tank circuit 46 oscillating at the same frequency.

The frequency discriminators 23A, 23B and 36, each consist of a tuned circuit 47 followed by a detector 48 which gives a D. C. output voltage proportional to the amplitude of the A. C. input voltage. Fig. 7 shows a graph of input frequency against D. C. output voltage of the forward and reverse frequency discriminators 23A and 23B. It will be noted that the maximum response is at 9,000 c./s. and 11,000 c./s. respectively. The forward relay 34 and the reverse relay 31 close when their D. C. input voltage, that is the frequency discriminator output voltage, exceeds a predetermined level $V_0$. This relay operating voltage $V_0$ corresponds to frequencies $f_A$ and $f_B$ at the input to the forward frequency discriminator 23A and the reverse frequency discriminator 23B, respectively. The preferred values for $f_A$ and $f_B$ are 9850 c./s. and 10,150 c./s. respectively, so that $(f_B - f_A)$ is 300 c./s.

The frequency difference $(f_B - f_A)$ is a dead zone in which neither the forward nor the reverse relay unit operates. This frequency difference of 300 c./s. is equivalent to unit change in iodine value and, since the oscillator frequency is 1.5 mc./s., this represents an accuracy in terms of frequency of 1 part in 5,000.

Thus, if the output frequency of the mixer 22 decreases from 10,000 c./s., the D. C. output voltage of the forward frequency discriminator 23A will increase, and when the mixer output frequency reaches $f_A$ the forward frequency discriminator output voltage reaches the level $V_0$ and operates the forward relay 34 which, in turn, energises the I. V. servomotor 24 to rotate the I. V. capacitor 25 until the mixer output frequency again lies between $f_A$ and $f_B$. Conversely, if the mixer output frequency increases, the reverse relay unit 31 will operate when the frequency has reached $f_B$, and cause the I. V. servomotor 24 to rotate the I. V. capacitor 25 until the mixer output frequency again lies between $f_A$ and $f_B$.

The circuit diagram of the forward frequency discriminator 23A and the forward relay unit 34 is shown in Fig. 8. The tuned circuit 47 consists of a pentode 49 having a parallel tuned circuit 50 whose natural frequency is 9,000 c./s. in its anode circuit. The detector 48 consists of a diode rectifier 51 and is connected across the pentode 49. The forward relay unit 34 consists of a thyratron 52 having the coil 53 of a post office type relay 54 in its anode circuit. The reverse frequency discriminator 23B is similar to that described above, except that the tuned circuit has a natural frequency of 11,000 c./s. The tuned circuit of the frequency discriminator 36 is tuned to 1.51 mc./s. but has a considerably wider bandwidth than that of the tuned circuit used in frequency discriminators 23A and 23B.

If desired, only one motor may be employed for adjusting both the I. V. capacitor and the zero balance capacitor. In this case the motor is coupled to the capacitors by means of electromagnetic clutches energised by the sequencing means as required.

The present invention may also be applied to measure and/or control a continuous process for the hydrogenation of the oil. Fig. 9 shows schematically an arrangement using one capacitance cell. Oil flows from a storage tank 90 through the hydrogenation vessel 92 and from there via a change over valve 96 through a capacitance cell 97. From the capacitance cell 97 it flows via a second valve 98 to the reservoir 94. The storage tank is also connected by a pipe with the change over valve 96 and by another pipe with valve 98. The arrangement is such that the capacitance cell 97 may be fed with oil from either the storage tank or from the outlet of the hydrogenation vessel, and valve 98 enables oil from the capacitance cell to be fed either to the inlet of the hydrogenation vessel or to the reservoir 94. For the purpose of clarity, pumps have been omitted.

The capacitance cell 97 is electrically connected to a capacitance measuring unit 99. This unit may be identical to that described with reference to Figs. 4–8. In that case oil from the storage vessel is passed through the capacitance cell into the hydrogenation vessel and the system is then balanced. The valves are then operated to let the oil from the storage vessel flow through the hydrogenation vessel and from there through the capacitance cell into the reservoir. The system will operate in the usual manner and the difference between the permittivity of the oil to be hydrogenated and the oil leaving the hydrogenation vessel will be indicated by the change in capacitance of the I. V. capacitor. This difference may be used to adjust a variable of the process to keep the difference at a predetermined value. Alternatively the difference may be obtained indirectly by measuring the deviation from a predetermined value. This system lends itself more readily to the control of the process. For this purpose some minor modifications to the capacitance measuring unit, as will be evident from the following description, are required.

In the modified arrangement oil from the storage vessel is passed through the capacitance cell into the hydrogenation vessel. The I. V. capacitor 25 is then rotated to a position corresponding to zero change in I. V. The unit is then balanced by adjusting the zero balance capacitor 26. The valves are then operated to let the oil from the storage vessel flow through the hydrogenation vessel and from there through the oil into the reservoir. At the same time the I. V. capacitor 25 is adjusted from a zero position to a position corresponding to the required change of capacitance. The I. V. servomotor 24 is now made responsive to the output of the frequency discriminator. If hydrogenation is being carried out at the required rate, the oil leaving the hydrogenation vessel will show the required change of permittivity corresponding to the predetermined change of the I. V. capacitor and the system will be in balance. Should hydrogenation not be occurring at the required rate, the output frequency of the frequency mixer will deviate from 10,000 mc./s. and the I. V. servomotor will adjust the I. V. capacitor. Thus any deviation from the required rate will be shown by corresponding change of the capacitance of the I. V. capacitor. The changes of the I. V. capacitor may, as described earlier, be transmitted by the selsyn transmitter and receiver and, if required, be recorded.

If it is also desired to control the process, the I. V. servomotor 24 or an additional motor responsive to the frequency discriminator, is used to adjust one of the variables of the process. The motor may operate a valve which adjusts the temperature of the oil, or the flow of oil through the hydrogenation vessel, or the supply of hydrogen or a combination of these. As has been stated earlier in the specification, the relationship between permittivity and the degree of unsaturation is effected by the temperature of the oil. Consequently, the permittivity of the oil must always be measured at the same temperature or an allowance made for the difference in temperature. It is preferred to keep the temperature of the oil flowing through the cell constant. This may be achieved by means of a heat exchanger.

Fig. 10 shows schematically an alternative arrangement utilising two capacitance cells. These cells should have identical electrode systems to enable them to be used with simple circuits. Oil flows from a storage tank 90 through a capacitance cell 91 hereinafter referred to as capacitance cell A, to the hydrogenation vessel 92 and from there through a second capacitance cell 93, hereinafter referred to as capacitance cell B, to the reservoir 94. For the purpose of clarity, pumps have been omitted. The two capacitance cells are electrically connected to the capacitance measuring unit 95. The capacitance measuring unit may be in the form of a heterodyne unit followed by a frequency discriminator, the heterodyne unit comprising two variable oscillators followed by a frequency mixer. The capacitance of the tank circuit of one oscillator may comprise the capacitance of cell A, and the capacitance in the tank circuit of the other oscillator may comprise the capacitance of cell B, and the capacitance of the I. V. capacitor. If necessary a zero balance capacitor may be used for initial balancing. The I. V. capacitor will then give directly the difference between the capacitance of cell A and cell B. In this example, too, the oil in the two cells must be at the same temperature when the permittivity is being measured or allowance must be made. It is preferred to keep the temperature of the oil in both cells at the same value. This may be achieved by heat exchange means.

Though Fig. 9 shows all the oil from the hydrogenation vessel being passed through the capacitance cell 97, and Fig. 10 shows all the oil being passed from the capacitance cells 91 and 93, in each case it is sufficient to pass a representative proportion through the cells.

It will be evident that hydrogenation may also be carried out in stages, the arrangement being such that the oil being hydrogenated flows continuously from one stage to the next. In that event the apparatus will be similar to that shown in Figs. 9 and 10 except that the hydrogenation vessel 92 will merely represent one stage of hydrogenation and that the oil leaving it, unless it be the last stage, will be passed to the next stage and not to the reservoir 94. Furthermore, unless the stage is the first, it will receive oil not from the storage vessel 90 but from the preceding stage. Thus for the purpose of this specification, the term hydrogenation vessel is intended to include one or more stages of hydrogenation.

We claim:

1. A method for measuring the progress of hydrogenation of a substance selected from the group consisting of animal and vegetable oils and fatty acids derived therefrom, which method comprises measuring the difference between the permittivity of the substance at the beginning and during the hydrogenation process at a frequency below that which produces relaxation of the dipoles of its molecules.

2. A method for measuring the progress of hydrogenation of a substance selected from the group consisting of animal and vegetable oils and fatty acids derived therefrom, which method comprises measuring the difference between the permittivity of the substance at the beginning and during the hydrogenation process at a frequency below that which produces relaxation of the dipoles of its molecules and keeping the temperature of the substance substantially constant during measurement.

3. A method for measuring the progress of hydrogenation of a substance selected from the group consisting of animal and vegetable oils and fatty acids derived therefrom, which method comprises measuring the difference between the permittivity of the substance at the beginning and during the hydrogenation process at a frequency within the radio-frequency range and below that which produces relaxation of the dipoles of its molecules and keeping the temperature of the substance substantially constant during measurement.

4. A method for measuring the progress of hydrogenation of a substance selected from the group consisting of animal and vegetable oils and fatty acids derived therefrom, which method comprises recording the difference between the permittivity of the substance at the beginning and during the hydrogenation process at a frequency within the radio-frequency range and below that which produces relaxation of the dipoles of its molecules and keeping the temperature of the substance substantially constant during measurement.

5. A method for controlling the hydrogenation process of a substance selected from the group consisting of animal and vegetable oils and fatty acids derived therefrom, which method comprises measuring the difference between the permittivity of the substance at the beginning and during the hydrogenation process at a frequency below that which produces relaxation of the dipoles of its molecules, if necessary making an allowance for temperature variations, and stopping the hydrogenation process when the difference in permittivity reaches a predetermined value.

6. A method for controlling the hydrogenation process of a substance selected from the group consisting of animal and vegetable oils and fatty acids derived therefrom, which method comprises measuring the difference between the permittivity of the substance at the beginning and during the hydrogenation process at a frequency below that which produces relaxation of the dipoles of its molecules, keeping the temperature of the substance substantially constant during measurement, and stopping the hydrogenation process when the difference in permittivity reaches a predetermined value.

7. A method for controlling the hydrogenation process of a substance selected from the group consisting of animal and vegetable oils and fatty acids derived therefrom, which method comprises measuring the difference between the permittivity of the substance at the beginning and during the hydrogenation process at a frequency below that which produces relaxation of the dipoles of its molecules, keeping the temperature of the substance substantially constant during measurement, comparing the difference in permittivity with a predetermined change of permittivity which should have been reached at the time of comparison, and developing from the deviation between the two values an error signal which automatically controls a variable of the process to reduce the deviation.

8. A method for measuring the change in the degree of unsaturation of a substance selected from the group consisting of animal and vegetable oils and fatty acid derived therefrom which is being hydrogenated by a continuous process, which method comprises measuring the difference between the permittivity of the substance to be hydrogenated and the permittivity of the substance leaving the hydrogenation vessel at a frequency below that which produces relaxation of the dipoles of its molecules and if necessary making an allowance for temperature variations.

9. A method for measuring the change in the degree of unsaturation of a substance selected from the group consisting of animal and vegetable oils and fatty acids derived therefrom which is being hydrogenated by a continuous process, which method comprises measuring the difference between the permittivity of the substance to be hydrogenated and the permittivity of the substance leaving the hydrogenation vessel at a frequency below that which produces relaxation of the dipoles of its molecules and keeping the temperature of the substance substantially constant during measurement.

10. A method for controlling the change in the degree of unsaturation of a substance selected from the group consisting of animal and vegetable oils and fatty acids derived therefrom which is being hydrogenated by a continuous process, which method comprises measuring the difference between the permittivity of the substance to be hydrogenated and the permittivity of the substance leaving the hydrogenation vessel at a frequency below that which produces relaxation of the dipoles of its molecules, keeping the temperature of the substance substantially constant during measurement, and developing from the difference in permittivity an error signal which automatically controls a variable of the process to keep this difference at a predetermined value.

11. Apparatus for measuring changes in the degree of unsaturation of a substance selected from the group consisting of animal and vegetable oils and fatty acids derived therefrom for the purpose of measuring the progress of hydrogenation, which apparatus comprises a hydrogenation vessel, a capacitance cell capable of utilising the substance as the dielectric, the capacitance cell being connected to the hydrogenation vessel to enable the substance from the vessel to pass through it, capacitance measuring means for measuring the capacitance of the capacitance cell, which means comprise a heterodyne unit followed by a frequency discriminator, the heterodyne unit comprising a fixed frequency oscillator, a variable frequency oscillator, and a frequency mixer, with the capacitance cell forming part of the capacitance of the tank circuit of the variable oscillator, a variable rebalancing capacitor connected in parallel with the capacitance cell, a variable zero balance capacitor connected in parallel with the capacitance cell, rebalancing servomotor for adjusting the rebalancing capacitor and capable of responding to the output of the frequency discriminator so as to keep the output frequency of the frequency mixer at a predetermined value, a zero balance servomotor for adjusting the zero balance capacitor and capable of responding to the output of the frequency discriminator so as to bring the output frequency of the frequency mixer to the predetermined value, and sequencing means which cause the rebalancing servomotor to be energised so as to adjust the rebalancing capacitor until it reaches a position corresponding to zero change in degree of unsaturation, thereafter causing the zero balance servomotor to respond to the output of the frequency discriminator to adjust the zero balance capacitor until the output frequency of the frequency mixer has a predetermined value, and then causes the rebalancing servomotor to respond to the output of the frequency discriminator to adjust the rebalancing capacitor to keep the output of the frequency mixer at the predetermined value.

12. Apparatus as claimed in claim 11 which includes stop means responsive to the capacitance measuring means to stop the hydrogenation process when the change in capacitance of the rebalancing capacitor has reached a predetermined value.

13. Apparatus as claimed in claim 12 which includes a desyn transmitter and a desyn receiver, the transmitter being mechanically coupled to the rebalancing capacitor, and the desyn receiver, which is electrically connected to the transmitter, serving as an indicator.

14. Apparatus for measuring changes in the degree of unsaturation of a substance selected from the group consisting of animal and vegetable oils and fatty acids derived therefrom for the purpose of measuring the progress of hydrogenation, which apparatus comprises a hydrogenation vessel, a capacitance cell capable of utilising the substance as the dielectric, the capacitance cell being connected to the hydrogenation vessel to enable the substance from the vessel to flow through it, heat exchange means for keeping the temperature of the substance flowing through the capacitance cell substantially constant, capacitance measuring means for measuring the capacitance of the capacitance cell, which means comprise a heterodyne unit followed by a frequency discriminator, the heterodyne unit comprising a fixed frequency oscillator, a variable frequency oscillator, and a frequency mixer, with the capacitance cell forming part of the capacitance of the tank circuit of the variable oscillator, a variable rebalancing capacitor connected in parallel with the capacitance cell, a variable zero balance capacitor connected in parallel with the capacitance cell, and a rebalancing servomotor for adjusting the rebalancing capacitor and capable of responding to the output of the frequency discriminator so as to keep the output frequency of the frequency mixer at a predetermined value, a zero balance servomotor for adjusting the zero balance capacitor and capable of responding to the output of the frequency discriminator so as to bring the output frequency of the frequency mixer to the predetermined value, and sequencing means which cause the rebalancing servomotor to be energised so as to adjust the rebalancing capacitor until it reaches a position corresponding to zero change in degree of unsaturation, thereafter causing the zero balance servomotor to respond to the output of the frequency discriminator to adjust the zero balance capacitor until the output frequency of the frequency mixer has a predetermined value and then causes the rebalancing servomotor to respond to the output of the frequency discriminator to adjust the rebalancing capacitor to keep the output of the frequency mixer at the predetermined value, a desyn transmitter mechanically coupled to the rebalancing capacitor, a desyn received which serves as an indicator electrically connected to the desyn transmitter, and stop means responsive to the capacitance measuring means to stop the hydrogenation process when the change in capacitance of the rebalancing capacitor has reached a predetermined value.

15. Apparatus for measuring changes in the degree of unsaturation of a substance selected from the group consisting of animal and vegetable oils and fatty acids derived therefrom for the purpose of measuring the progress of hydrogenation, which apparatus comprises a hydrogenation vessel arranged to hydrogenate the substance by a continuous process, a capacitance cell capable of utilising the substance as the dielectric, said capacitance cell being connected by means of a change-over valve to the outlet of the hydrogenation vessel to enable at least a portion of the substance leaving the vessel to flow through it, said cell also being connected by means of said change-over valve with the substance to be hydrogenated to enable at least a portion of the substance to be hydrogenated to flow through it, and capacitance measuring means for measuring the difference between the capacitance of the capacitance cell when filled with the substance to be hydrogenated and the capacitance of the capacitance cell when filled with the substance leaving the vessel.

16. Apparatus as claimed in claim 15 for controlling the hydrogenation process which includes means responsive to the capacitance measuring means for adjusting a variable of the process to keep this difference at a predetermined value.

17. Apparatus for measuring changes in the degree of unsaturation of a substance selected from the group consisting of animal and vegetable oils and fatty acids derived therefrom for the purpose of measuring the progress of hydrogenation, which apparatus comprises a hydrogenation vessel arranged to hydrogenate the substance by a continuous process, a capacitance cell capable of utilising the substance as the dielectric, said capacitance cell being connected by means of a change-over valve to the outlet of the hydrogenation vessel to enable at least a portion of the substance leaving the vessel to flow through it, said cell also being connected by means of said change-over valve with the substance to be hydrogenated to enable at least a portion of the substance to be hydrogenated to flow through it, heat exchange means for keeping the temperature of the substance flowing through the capacitance cell substantially constant, and capacitance measuring means for measuring the difference between the capacitance of the capacitance cell when filled with the substance to be hydrogenated and the capacitance of the capacitance cell when filled with the substance leaving the vessel, which means comprises a heterodyne unit followed by a frequency discriminator, the heterodyne unit comprising a fixed frequency oscillator, a variable frequency oscillator, and a frequency mixer, with the capacitance cell forming part of the capacitance of the tank circuit of the variable oscillator, and means responsive to the capacitance measuring means for adjusting a variable of the process to keep this difference at a predetermined value.

18. Apparatus for measuring changes in the degree of unsaturation of a substance which is selected from the group consisting of animal and vegetable oils and fatty acid derived therefrom and which is hydrogenated by a continuous process in a hydrogenation vessel having an inlet and outlet by which, respectively, said substance enters and leaves said vessel in the course of said continuous hydrogenation, said apparatus comprising, a first capacitance cell connected to the outlet of the hydrogenation vessel to enable at least a portion of the substance leaving the vessel to flow through it, a second capacitance cell connected to the inlet of the hydrogenation vessel to enable at least a portion of the substance entering the vessel to flow through it, and a heterodyne unit comprising a variable frequency oscillator with one capacitance cell forming at least a part of the capacitance of the tank circuit of the oscillator, a second variable frequency oscillator with the other capacitance cell forming at least a part of the capacitance of the tank circuit of the oscillator, and a frequency mixer, said heterodyne unit being adapted to provide an output signal having a characteristic which varies in accordance with the difference in capacity between said first and second capacitance cells.

19. Apparatus as claimed in claim 18 which includes heat exchange means for keeping the temperature of the substance flowing through the capacitance cells substantially constant.

20. Apparatus as claimed in claim 18 which includes means responsive to the output signal from the heterodyne unit for adjusting a variable of the process to keep this difference at a predetermined value.

21. Apparatus as claimed in claim 18 which includes pressure control means for keeping the pressure of the substance flowing through the capacitance cells substantially constant.

22. Apparatus for controlling changes in the degree of unsaturation of a substance selected from the group consisting of animal and vegetable oils and fatty acids derived therefrom for the purpose of controlling the progress of hydrogenation, which apparatus comprises a hydrogenation vessel for hydrogenating the substance by a continuous process, a capacitance cell connected to the outlet of the hydrogenation vessel to enable at least a portion of the substance leaving the vessel to flow through it, a second capacitance cell connected to the inlet of the hydrogenation vessel to enable at least a portion of the substance entering the vessel to flow through it, means for keeping the temperature of the substance flowing through the capacitance cells substantially constant, means for keeping the pressure of the substance flowing through the capacitance cells substantially constant, capacitance measuring means for measuring the difference in the capacitance of the two capacitance cells, which means comprise a heterodyne unit followed by a frequency discriminator, the heterodyne unit comprising a variable frequency oscillator with one capacitance cell forming at least a part of the capacitance of the tank circuit of the oscillator, a second variable frequency oscillator with the other capacitance cell forming at least a part of the capacitance of the tank circuit of the oscillator, and a frequency mixer, and means responsive to the capacitance measuring means for adjusting a variable of the process to keep this difference at a predetermined value.

23. Apparatus for measuring changes in the degree of unsaturation of a substance selected from the group consisting of animal and vegetable oils and fatty acids derived therefrom for the purpose of measuring the progress of hydrogenation, which apparatus comprises, a hydrogenation vessel, a capacitance cell coupled in a conduit having an outlet and an inlet at least one of which is connected with said vessel, said cell being adapted to use as a dielectric the substance flowing through said conduit, a first heat exchanger coupled in said conduit between said inlet and said cell to adjust the temperature of substance flowing through said conduit to a first order approximation to a predetermined value, a second heat exchanger coupled in said conduit between said first heat exchanger and said cell to adjust the temperature of substance flowing through said conduit to a second order approximation to said predetermined value, a pump disposed in said conduit at a location where the temperature of substance flowing through said conduit has been adjusted by at least one of said heat exchangers, said pump being adapted to induce flow of said substance through said conduit from said inlet to said outlet, and capacitance measuring means for measuring the capacitance of the capacitance cell.

24. Apparatus for measuring changes in the degree of unsaturation of a substance selected from the group consisting of animal and vegetable oils and fatty acids derived therefrom for the purpose of measuring the progress of hydrogenation, which apparatus comprises, a hydrogenation vessel, a capacitance cell capable of utilizing the substance as a dielectric, the cell being connected to the hydrogenation vessel to enable the substance from the vessel to pass through it, a variable rebalancing capacitor having a reference setting therefor, a variable calibrating capacitor coupled with said cell and with said rebalancing capacitor to provide conjointly therebetween a combined capacitance, a motor adapted to drive said variable calibrating capacitor to provide adjustment in the capacitance thereof, a closed loop servo system responsive to a deviation of said combined capacitance from a predetermined value for selectively adjusting said rebalancing capacitor and said calibrating capacitor to respective settings adjusting said combined capacitance to said predetermined value, said servo system being adapted to adjust the capacitance of said calibrating capacitor by means of the driving action of said motor, first and second connecting-disconnecting devices, coordinating means common to both said devices for rendering the same operable in an automatic sequence wherein said first and second devices are rendered in connect condition in the order named to initially and subsequently connect respectively said calibrating and rebalancing capacitors with said servo system for adjustment by said servo system during initial and subsequent adjustments of said combined capacitance to said predetermined value, said rebalancing and calibrating capacitors during said initial and subsequent adjustments respectively being respectively maintained at said reference setting and at the setting produced by initial adjustment and means for initiating the said automatic sequence of operation of said first and second devices.

25. Apparatus for measuring changes in the degree of unsaturation of a substance selected from the group consisting of animal and vegetable oils and fatty acids derived therefrom for the purpose of measuring the progress of hydrogenation, which apparatus comprises, a hydrogenation vessel, a capacitance cell capable of utilizing the substance as a dielectric, the cell being connected to the hydrogenation vessel to enable the substance from the vessel to pass through it, a variable rebalancing capacitor, a variable calibrating capacitor coupled with said cell and with said rebalancing capacitor to provide conjointly therebetween a combined capacitance, a motor adapted to drive said variable calibrating capacitor to provide adjustment in the capacitance thereof, a closed loop servo system responsive to deviation of said combined capacitance from a predetermined value for selectively positioning said rebalancing capacitor and said calibrating capacitor to respective settings adjusting said combined capacitance to said predetermined value, said servo system being adapted to adjust said calibrating capacitor by means of the driving action of said motor, first and second connecting-disconnecting devices, coordinating means common to both said devices for rendering the same operable in an automatic sequence wherein said first device, second device and again said first device are rendered in connect condition in the order named to connect said servo system to adjust said rebalancing capacitor to a reference setting and to then initially adjust the combined capacitance to said predetermined value by adjusting said calibrating capacitor while maintaining said rebalancing capacitor at its reference setting, and to then connect said servo system so that for deviations in combined capacitors thereafter said servo system adjusts the combined capacitance to said predetermined value by adjusting said rebalancing capacitor while maintaining said calibrating capacitor at the setting imparted to it by initial adjustment, and means for initiating the said automatic sequence of operation of said first and second devices.

26. Apparatus for hydrogenating batchwise a substance selected from the group consisting of animal and vegetable oils and fatty acids derived therefrom, said apparatus comprising, a hydrogenation vessel adapted to receive a batch of said substance to progressively hydrogenate the same, a conduit connected with said vessel to sample the substance therein during hydrogenation by flow of some of said substance through said conduit, a capacitance cell connected in said conduit to have the substance flowing therein act as the dielectric material for said cell, said cell being adapted by changes in the capacitance thereof to provide an index of the progress of hydrogenation of said substance, a variable rebalancing capacitor connected with said cell to provide conjointly therebetween a combined capacitance, a closed loop servo system responsive to a deviation of said combined capacitance from a predetermined value for adjusting said rebalancing capacitor to restore said combined capacitance to said predetermined value, and an end point controller responsive to an accumulated amount of adjustment of said rebalancing capacitor which corresponds to a preselected degree of hydrogenation of said substance for stopping the progress of hydrogenation in said vessel.

27. Apparatus for hydrogenating batchwise a substance selected from the group consisting of animal and vegetable oils and fatty acid derived therefrom, said apparatus comprising, a hydrogenation vessel adapted to receive a batch of said substance to progressively hydrogenate the same, a conduit connected with said vessel to sample the substance therein by flow of some of said substance through said conduit, a capacitance cell connected in said conduit to have the substance flowing therein act as the dielectric material for said cell, said cell being adapted by changes in the capacitance thereof to provide an index of the progress of hydrogenation of said substance, a variable rebalancing capacitor connected with said cell to provide conjointly therebetween a combined capacitance, a closed loop servo system responsive to a deviation of said combined capacitance from a predetermined value for adjusting said rebalancing capacitor to restore said combined capacitance to said predetermined value, the accumulated amount by which rebalancing capacitor has been adjusted providing a running indication of the progress of hydrogenation of said substance in said vessel, programming means adapted during said progressive hydrogenation to develop an indication with a time profile representing a preselected mode of progress for the hydrogenation of said substance, comparison means conjointly responsive to said last-named indication and to the accumulated amount of adjustment of said rebalancing capacitor to produce a signal representing the deviation in actual progress of hydrogenation from the preselected mode of progress therefor, and an end point controller responsive to said signal for adjusting a variable of the hydrogenation process to produce a following thereby of the preselected mode of progress therefor.

28. Apparatus for hydrogenating a fluid substance selected from the group of animal and vegetable oils and fatty acids derived therefrom, said apparatus comprising, a hydrogenation vessel, conduit means connected to said vessel to carry said substance thereto for hydrogenation and to carry off said substance therefrom after hydrogenation, capacitance cell means adapted to utilize said substance as the dielectric thereof and connected to said conduit means to receive separate bodies respectively formed of said substance before entrance thereof into said chamber and of said substance after discharge thereof from said chamber, and capacitance measuring means electrically connected to said cell means to measure the difference in the permittivities of the substance forming said separate bodies, said difference being an index of the degree of hydrogenation of said substance in said vessel.

References Cited in the file of this patent

UNITED STATES PATENTS

| | | |
|---|---|---|
| Re. 14,568 | Ellis | Dec. 17, 1918 |
| 1,895,118 | Allen | Jan. 24, 1933 |
| 1,984,166 | Walter | Dec. 11, 1934 |
| 2,071,607 | Bjorndal | Feb. 23, 1937 |
| 2,387,496 | Cornelius | Oct. 23, 1945 |
| 2,499,626 | Bowman | Mar. 7, 1950 |
| 2,520,424 | Mills et al. | Aug. 29, 1950 |
| 2,551,034 | Merriman et al. | May 1, 1951 |
| 2,565,121 | Clardy et al. | Aug. 21, 1951 |
| 2,577,612 | Fay | Dec. 4, 1951 |
| 2,599,583 | Robinson | June 10, 1952 |
| 2,607,828 | Razek | Aug. 19, 1952 |
| 2,607,830 | Razek | Aug. 19, 1952 |
| 2,613,249 | Babb | Oct. 7, 1952 |
| 2,623,928 | Bower | Dec. 30, 1952 |

OTHER REFERENCES

Markely: "Fatty Acids" (1947), Interscience Pub. Inc., New York, pages 243–246.